Nov. 13, 1956   P. A. VANCE   2,770,738
STATIC ELECTRICAL PULSATION APPARATUS
Filed Dec. 5, 1955
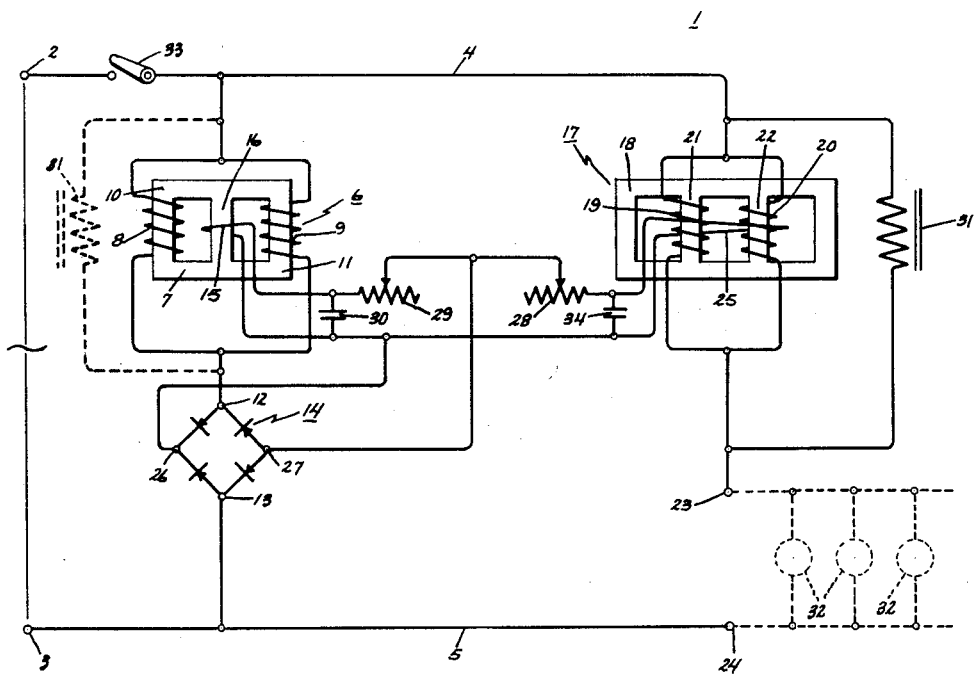
Inventor:
Paul A. Vance,
by [signature]
His Attorney.

United States Patent Office 2,770,738
Patented Nov. 13, 1956

2,770,738

STATIC ELECTRICAL PULSATION APPARATUS

Paul A. Vance, Columbia City, Ind., assignor to General Electric Company, a corporation of New York Application December 5, 1955, Serial No. 550,887

18 Claims. (Cl. 307—88)

This invention relates to electrical pulsation apparatus and more particularly to static electrical apparatus for converting a relatively constant alternating current voltage to an alternating current voltage which pulsates at a relatively low frequency.

There are instances where it is desirable to provide a source of power which pulsates, i. e., in which the voltage successively rises and falls at a relatively slow rate; a typical example of such a requirement is in the operation of flashing advertising signs. It is desirable that the apparatus for providing this pulsating voltage operate from the commercial power source, generally 60 cycle alternating current and it is further desirable that this apparatus be capable of operating a large number of incandescent lamps commonly used in such signs.

In the past, electric motor driven dimmers have commonly been used for operating flashing advertising signs. These equipments necessarily have contact making brushes and thus require relatively high maintenance, both for the motor and the contact mechanism. Because of this maintenance requirement such equipment must be installed in relatively accessible locations. Furthermore, since this type of apparatus operates by successively cutting in or out portions of a resistance bank, the variation is generally somewhat jerky and not continuously smooth as is desirable.

It is therefore desirable to provide a static electrical device, i. e., one without moving parts, operating from an alternating current source of power providing a pulsating output voltage, which will thus require substantially no maintenance and can therefore be installed in any desired location including those which are relatively inaccessible. Static pulsation apparatus has been devised in the past, however, they were generally quite complex. Some of these prior static devices utilized vacuum tubes which are subject to shock and costly in the sizes required for the heavy currents involved. Others used tuned circuits for producing the pulsations thus again adding to the cost and complexity.

It is, therefore, desirable to provide a static pulsation device which has a minimum number of components and which is sturdy, i. e., not subjected to shock, relatively small in size and weight, which provides a continually smooth output voltage variation, and which is competitive with present equipment.

An object of this invention is therefore to provide improved static electrical pulsation apparatus.

Another object of this invention is to provide improved static electrical pulsation apparatus incorporating the desirable features outlined above.

Further objects and advantages of this invention will become apparent by reference to the following description and the accompanying drawing, and the features of novelty which characterize this invention will be pointed out with particularity in the claims annexed to and forming a part of this specification.

This invention in its broadest aspects, provides a pair of alternating current supply lines and a first saturable core reactor having a core with at least one alternating current gate winding and a direct current saturating winding thereon. A rectifier is provided having its input connected in series with the gate winding across the supply lines. A second saturable core reactor having a longer time constant than the first saturable core reactor is provided, the second saturable core reactor also having a core with at least one alternating current gate winding and a direct current saturating winding thereon. A pair of output lines are provided with the gate winding of the second saturable core reactor connected between one of the supply lines and one of the output lines and the other output line being connected to the other supply line. The direct current saturating windings of both saturable core reactors are connected respectively across the output of the rectifier. This apparatus therefore has only three essential components, i. e., two saturable core reactors and a rectifier, in contrast with previous rotating equipment or more complex static devices.

The single figure of the drawing is a schematic illustration of the improved static electrical pulsation apparatus of this invention.

Referring now to the drawing, the improved static electrical pulsation apparatus of this invention, generally identified as 1, basically includes a pair of input terminals 2 and 3 which are adapted to be connected to an external source of alternating current (not shown). Input terminals 2 and 3 are connected to alternating current supply lines 4 and 5 respectively. A first saturable core reactor 6 is provided, shown here as having a three-legged core member 7 formed of suitable magnetic material with alternating current gate windings 8 and 9 positioned on the outside legs 10 and 11 respectively. Gate windings 8 and 9 are preferably connected in parallel, as shown on the drawing, and in turn are connected in series with input corners 12 and 13 of rectifier 14, which is preferably of the dry type, across alternating current supply lines 4 and 5 as shown. Saturable core reactor 6 has a direct current saturating winding 15 positioned on the center leg 16 of core member 7.

A second saturable core reactor 17 is provided, shown here as having a four-legged core member 18 again formed of suitable magnetic material. Saturable core reactor 17 has alternating current gate windings 19 and 20 positioned on center legs 21 and 22 respectively of core member 18 and preferably connected in parallel as shown. Gate windings 19 and 20 are connected between supply line 4 and output terminal 23, the other output terminal 24 being connected to supply line 5. Saturable core reactor 17 is also provided with direct current saturating winding 25 which embraces both of the center legs 21 and 22 of core member 18. For a reason to be more fully explained hereinafter, saturable core reactor 17 has a longer time constant than saturable core reactor 6, and direct current saturating winding 25 has a lower impedance than direct current saturating winding 15.

Direct current saturating windings 15 and 25 are connected across output corners 26 and 27 of bridge rectifier 14 with variable resistance 28 preferably connected in series with saturating winding 25 and variable resistance 29 preferably connected in series with saturating winding 15. Output terminals 23 and 24 are adapted to be connected to a load, such as, for example, a plurality of incandescent lamps 32 as used in an advertising sign.

A capacitor 30 may be connected across saturating winding 15 as shown and a bypass linear reactor 31 may be connected across gate windings 19 and 20 of saturable core reactor 17 in order to provide improved operation in the particular application shown. A capacitor 34 may alternatively be connected across saturating winding 25, or capacitors 30 and 34 may be connected across both saturating windings 15 and 25. Bypass reactor 31 may alternatively be connected across gate windings 8 and 9 of saturable core reactor 6, as shown.

The operation of the improved static electrical pulsation apparatus of this invention will now be described. When switch 33 in supply line 4 is initially closed, saturable core reactor 6 will have a minimum degree of saturation in its core member 7 and thus the impedance of the gate windings 8 and 9 will be at a maximum. The impedance of the rectifier 14 is initially low with respect to the impedance of gate windings 8 and 9 and thus the voltage drop thereacross will also be relatively low. If variable resistance 28 is adjusted so that there is no resistance in the circuit of direct current saturating winding 25, saturating winding 25 will draw substantially more current than saturating winding 15 so that there is no tendency for saturating winding 15 to increase the degree of saturation in core 7 and thus the impedance of gate windings 8 and 9 remains at its maximum value, thus providing a maximum voltage drop across gate windings 8 and 9 and minimum voltage drop across rectifier 14. With this voltage across rectifier 14, the current flow in saturating winding 25 is insufficient to increase the degree of saturation in core 18 of saturable core reactor 17 and thus the impedance of gate windings 19 and 20 is also at a maximum. Lamps 32 would normally under this condition be completely out, however, if it is desired that these lamps do not go completely out but rather have a minimum brilliance, bypass reactor 31 will maintain a minimum current flow through the lamps when gate windings 19 and 20 are at their maximum impedance so that the lamps do not go completely out.

If, however, variable resistance 28 is set so that some resistance is provided in the circuit of direct current saturating winding 25, the net impedance across rectifier 14 will be somewhat higher with a resultant somewhat high voltage drop across rectifier 14. This higher voltage than that which prevailed with no resistance in the circuit of direct current saturating winding 25 will cause a greater current to flow through direct current saturating winding 15 which will be sufficient to cause some saturation of core 7 of saturable core reactor 6. This saturation tends to lower the impedance of gate windings 8 and 9 which in turn increases the current flow therethrough and the voltage drop across the rectifier 14. The increase in the voltage drop across the rectifier 14 in turn increases the current flowing in direct current saturating winding 15 again increasing the saturation of the core 7 and this process continues until core 7 has reached its maximum degrees of saturation with gate windings 8 and 9 at their minimum impedance.

The progressive increase in the voltage drop across rectifier 14 will of course result in increased current flow through direct current saturating winding 25 of saturable core reactor 17. This, in turn, increases the degree of saturation of core 18 with a resultant lowering of the impedance of gate windings 19 and 20 which in turn lowers the voltage drop across the gate windings and increases the voltage across the output terminals 23 and 24 thereby increasing the voltage across the lamps with a resultant increase in their brilliance. This process also continues until core 18 of saturable core reactor 17 has reached its maximum degree of saturation with gate windings 19 and 20 at their minimum impedance and lamps 32 at their maximum brilliance.

Since direct current saturating windings 15 and 25 of saturable core reactors 6 and 7 are actually coils on magnetic cores and since they are coupled to their associated gate windings, both have impedance and a time constant. Furthermore, the increasing unidirectional voltage provided by rectifier 14 has an alternating current component. As is indicated hereinabove, saturable core reactor 17 has a slower time constant than the saturable core reactor 6. Thus, saturable core reactor 6 will become saturated slightly before saturable core reactor 17.

The increase in saturation of core 7 of saturable core reactor 6 not only lowers the impedance of gate windings 8 and 9, but also lowers the impedance of direct current saturating winding 15. This lowering of the impedance of saturating winding 15 however, merely tends to increase the current flowing therein and to produce still further saturation of core 7 of saturable reactor 6. As the core 18 of saturable reactor 17 becomes saturated, however, the impedance of direct current saturating winding 25 goes down with reference to impedance of direct current saturating winding 15 of saturable core reactor 6 which has already reached its minimum value. Direct current saturating winding 25 therefore draws a slightly larger amount of current with respect to the current being drawn by direct current saturating winding 15 since the current divides inversely proportional to the impedances. With the impedance of direct current saturating winding 25 reducing after the impedance of direct current saturating winding 15 has reached its minimum value, the current through direct current saturating winding 15 will be reduced slightly as saturable core reactor 17 becomes saturated. This reduction in the current in direct current saturating winding 15 reduces the degree of saturation in core 7 of saturable core reactor 6 therefore increasing the impedance of gate windings 8 and 9 and reducing the voltage across rectifier 14. Reduction in voltage across rectifier 14 results in a reduction in current in direct current saturating winding 25 with a resultant decrease in the degree of saturation of core 18 and increase in the impedance of gate windings 19 and 20 so that the current through lamps 32 is reduced and the brilliance of the lamp is also reduced. At the same time, the current flowing in direct current saturating winding 15 of saturable core reactor 6 is still further reduced thus again decreasing the degree of saturation of core 7 and increasing the impedance of gate windings 8 and 9 thereby still further decreasing the voltage drop across rectifier 14. This process continues until minimum saturation is reached in both of the saturable core reactors 6 and 17 at which time the lamps 32 will be at their minimum brilliance and the impedances of the gate windings of saturable core reactors 6 and 17 and the voltage across the rectifier 14 are at the same values as they were when the first cycle started. The process then repeats itself with direct current saturating winding 15 causing progressively increased saturation of core 7 thus decreasing the impedances of gate windings 8 and 9 and increasing the voltage across rectifier 14 thereby increasing the current flow in direct current saturating winding 25 to increase the saturation of core 18 and decrease the impedance of gate windings 19 and 20 to increase the current flow in lamps 32. As is indicated above, the cycle is reversed and the lamps are dimmed by virtue of the fact that saturable core reactor 17 has a longer time constant than saturable core reactor 6 so that core 18 of saturable core reactor 17 saturates after core 7 of saturable core reactor 6, which saturation is accompanied by reduction of the impedance of the saturating winding 25 after saturating winding 15 has reached its minimum impedance thereby changing the ratio of the impedances of the two saturating windings so that saturating winding 15 is caused to draw less current thereby to initiate the dimming half of the cycle.

As is indicated above, bypass reactor 31 insures minimum flow of current in lamps 32 so that they do not go completely out at the low point of each cycle when the impedances of all the gate windings of the saturable core reactors 6 and 17 are at their maximum. Saturable core reactor 17 and bypass reactor 31 are preferably designed so that at minimum impedance of gate windings 19 and 20, the lamps 32 have the desired maximum brilliance. Bypass reactor 31 may, of course, be eliminated if there is no objection to lamps 32 going completely out during each cycle.

It has been found that the relative resistance of the circuits of the two direct current saturating windings 15 and 25 is quite critical and it is therefore desirable to provide variable resistances 28 and 29 in the circuits of both direct current saturating windings in order to secure better adjustment of the relative resistance of the two circuits. It will be readily apparent that the desired resistance could be built into the direct current saturating windings 15 and 25, however, it has been found preferable to make the resistance of the windings themselves low and use separate external resistors which are not normally affected by external temperature changes. The desired resistances can be incorporated in the direct current saturating windings 15 and 25 by use of suitable low temperature co-efficient wire however.

While, as indicated above, the relative value of the resistances of the circuits of direct current saturating windings 15 and 25 is quite critical, this sensitivity can be reduced by placing capacitor 30 across direct current saturating winding 15. This capacitor also has the effect of increasing the frequency of the pulsations at the output terminals 23 and 24. It has been observed that placing a capacitor across direct current saturating winding 25 of saturable core reactor 17 does not appear to reduce the sensitivity of the circuits of the two direct current saturating windings, however, it does reduce the frequency of the output pulsation. The frequency of pulsation is not readily adjustable but is rather dependent upon the difference in the inherent time constants of the two saturable core reactors discussed above. No manual adjustment of the frequency of the pulsations is provided, however, for the operation of flashing advertising signs the desired frequency of pulsation can be provided with sufficient accuracy in the design of the two saturable core reactors 6 and 17. It should be pointed out that capacitor 30 in the circuit of direct current saturating winding 15 of saturable core reactor 6 does not provide a resonant circuit for initiating, triggering, or sustaining the output pulsations and thus is not a major timing element, but on the contrary is only provided to effect sensitivity and a very minor change in the frequency of the output pulsations; the circuit described above inherently provides the output pulsations whether or not the capacitor 30 is provided and thus the capacitor is not part of the basic circuit and may not be required in any specific design.

In an actual device constructed in accordance with this invention for flashing 94 120-volt incandescent lamps, core 7 of saturable core reactor 6 was 3½ inches long and 3 inches wide with a stack height of 1⅛ inches. Outside core legs 10 and 11 were 9/16 inch wide respectively and center core leg 15 was 1 inch wide. Gate windings 8 and 9 were respectively composed of 860 turns of No. 30 wire while direct current saturating winding 15 was formed of 12,000 turns of No. 36 wire and had a resistance of 2,600 ohms. Core 18 of saturable core reactor 17 was 8⅝ inches long and 7 3/16 inches wide with a stack height of 4 inches and with the outside legs being 1 7/16 inches wide respectively and the center legs 21 and 22 being 1 inch wide respectively. Gate windings 19 and 20 of saturable core reactor 17 were respectively formed of 128 turns of .0856 inch diameter wire while direct current saturating winding 25 was formed of 2780 turns of No. 22 wire and had a resistance of 85 ohms. Resistors 28 and 29 had maximum resistances of 100 ohms and 5,000 ohms respectively while capacitor 30 had a capacitance of 90 microfarads. Rectifier 14 was rated at 100 volts and 1 ampere. Bypass reactor 31 had an inductance of .0443 henries. With this arrangement, the current flowing in the circuit of saturable core reactor 6 varied from a low of .08 ampere to a high of .4 ampere while the output voltage across output terminals 23 and 24 varied from a low of 40 volts to a high of 110 volts with the output current varying from a low of 9 amperes to a high of 19 amperes with 94 120-volt lamps connected in the output circuit and with 120 volts, 60 cycle, single phase, alternating current applied to input terminals 2 and 3.

While saturable core reactor 6 has been shown as being of three legged type with gate windings 8 and 9 connected in parallel, and saturable core reactor 17 has been shown as being of the four legged type with gate windings 19 and 20 connected in parallel, it will be readily understood that other types and forms of saturable core reactors may be utilized, the important factor being the slower time constant of saturable core reactor 17. As indicated above, resistances 28 and 29 may be built into direct current saturating windings 15 and 25 and capacitor 30 and bypass reactor 31 may be eliminated. In addition, it will be readily apparent that other forms of rectifiers may be used rather than the bridge rectifier 14. Furthermore, it will be readily apparent that fluorescent or other arc discharge lamps may be operated by this system by use of suitable ballast devices, and that the system is equally applicable in any application where cyclic control of the input of a current consuming device is desired; the system will operate a pure resistance load such as a heating device.

It will now be readily apparent that this invention provides a static electrical pulsation device which is characterized by its simplicity since only three essental components are involved, i. e., the two saturable core reactors 6 and 17 and the rectifier 14. It will also be readily apparent that the apparatus is sturdy since no vacuum tubes are utilized and that relatively little maintenance will be required since there are no moving parts. It will further be observed that the pulsations are not provided by any tuned circuits, the capacitor 30 merely being provided to reduce the sensitivity of the relative resistances of the direct current saturating windings and further being located in the circuit of one of the saturating windings rather than in a power circuit.

While I have illustrated and described a particular embodiment of this invention, further modifications and improvements will occur to those skilled in the art. I desire that it be understood therefore that this invention is not limited to the particular form shown and I intend in the appended claims to cover all modifications which do not depart from the spirit and scope of this invention.

What I claim as new and desire to secure by Letters Patent of the United States is:

1. Static electrical pulsation apparatus comprising a pair of alternating current supply lines, a first saturable core reactor having a core with at least one alternating current gate winding and a direct current saturating winding thereon, a rectifier having its input connected in series with said gate winding across said supply lines, a second saturable core reactor having a longer time constant than said first said saturable core reactor and having a core with at least one alternating current gate winding and a direct current saturating winding thereon, said last named saturating winding having a lower impedance than said first named saturating winding, and a pair of output lines, said last named gate winding being connected between one of said supply lines and one of said output lines, the other of said output lines being connected to the other of said supply lines, said saturating windings being connected respectively across the output of said rectifier.

2. Static electrical pulsation apparatus comprising a pair of alternating current supply lines, a first saturable core reactor having a core with at least one alternating current gate winding and a direct current saturating winding thereon, a rectifier having its input connected in series with said gate winding across said supply lines, a second saturable core reactor having a longer time constant than said first said saturable core reactor and having a core with at least one alternating current gate winding and a direct current saturating winding thereon, said last named saturating winding having a lower impedance than said first named saturating winding, a pair of output lines, said last named gate winding being connected between one of said supply lines and one of said output lines, the other of said output lines being connected to the other of said supply lines, said saturating windings being connected respectively across the output of said rectifier, and resistance means connected in series with said last named said saturating winding.

3. Static electrical pulsation apparatus comprising a pair of alternating current supply lines, a first saturable core reactor having a core with at least one alternating current gate winding and a direct current saturating winding thereon, a rectifier having its input connected in series with said gate winding across said supply lines, a second saturable core reactor having a longer time constant than said first said saturable core reactor and having a core with at least one alternating current gate winding and a direct current saturating winding thereon, said last named saturating winding having a lower impedance than said first named saturating winding, a pair of output lines, said last named gate winding being connected between one of said supply lines and one of said output lines, the other of said output lines being connected to the other of said supply lines, said saturating windings being connected respectively across the output of said rectifier, and resistance means respectively connected in series with each of said saturating windings.

4. Static electrical pulsation apparatus comprising a pair of alternating current supply lines, a first saturable core reactor having a core with at least one alternating current gate winding and a direct current saturating winding thereon, a rectifier having its input connected in series with said gate winding across said supply lines, a second saturable core reactor having a longer time constant than said first said saturable core reactor and having a core with at least one alternating current gate winding and a direct current saturating winding thereon, said last named saturating winding having a lower impedance than said first named saturating winding, a pair of output lines, said last named gate winding being connected between one of said supply lines and one of said output lines, the other of said output lines being connected to the other of said supply lines, said saturating windings being connected respectively across the output of said rectifier, and variable resistors respectively connected in series with each of said saturating windings.

5. Static electrical pulsation apparatus comprising a pair of alternating current supply lines, a first saturable core reactor having a core with at least one alternating current gate winding and a direct current saturating winding thereon, a rectifier having its input connected in series with said gate winding across said supply lines, a second saturable core reactor having a longer time constant than said first said saturable core reactor and having a core with at least one alternating current gate winding and a direct current saturating winding thereon, said last named saturating winding having lower impedance than said first named saturating winding, a pair of output lines, said last named gate winding being connected between one of said supply lines and one of said output lines, the other of said output lines being connected to the other of said supply lines, said saturating windings being connected respectively across the output of said rectifier, and a capacitor connected across at least one of said saturating windings.

6. Static electrical pulsation apparatus comprising a pair of alternating current supply lines, a first saturable core reactor having a core with at least one alternating current gate winding and a direct current saturating winding thereon, a rectifier having its input connected in series with said gate winding across said supply lines, a second saturable core reactor having a longer time constant than said first said saturable core reactor and having a core with at least one alternating current gate winding and a direct current saturating winding thereon, said last named saturating winding having a lower impedance than said first named saturating winding, a pair of output lines, said last named gate winding being connected between one of said supply lines and one of said output lines, the other of said output lines being connected to the other of said supply lines, said saturating windings being connected respectively across the output of said rectifier, and an inductance connected across one of said gate windings.

7. Static electrical pulsation apparatus comprising a pair of input terminals adapted to be connected to a source of alternating current, a first saturable core reactor having a core with a pair of alternating current gate windings and a direct current saturating winding thereon, said gate windings being connected in parallel, a rectifier having its input connected in series with said gate windings across said input terminals, a second saturable core reactor having a longer time constant than said first saturable core reactor and having a core with a pair of alternating current gate windings and a direct current saturating winding thereon, said last named saturating winding having a lower impedance than said first named saturating winding, said last named gate windings being connected in parallel, and a pair of output terminals, said last named gate windings being connected between one of said input terminals and one of said output terminals, the other of said output terminals being connected to the other of said input terminals, said saturating windings being connected respectively across the output of said rectifier.

8. Static electrical pulsation apparatus comprising a pair of input terminals adapted to be connected to a source of alternating current, a first saturable core reactor having a core with a pair of alternating current gate windings and a direct current saturating winding thereon, said gate windings being connected in parallel, a rectifier having its input connected in series with said gate windings across said input terminals, a second saturable core reactor having a longer time constant than said first saturable core reactor and having a core with a pair of alternating current gate windings and a direct current saturating winding thereon, said last named saturating winding having lower impedance than said first named saturating winding, said last named gate windings being connected in parallel, a pair of output terminals, said last named gate windings being connected between one of said input terminals and one of said output terminals, the other of said output terminals being connected to the other of said input terminals, said saturating windings being connected respectively across the output of said rectifier, and resistance means connected in series with said last named saturating windings.

9. Static electrical pulsation apparatus comprising a pair of input terminals adapted to be connected to a source of alternating current, a first saturable core reactor having a core with a pair of alternating current gate windings and a direct current saturating winding thereon, said gate windings being connected in parallel, a rectifier having its input connected in series with said gate windings across said input terminals, a second saturable core reactor having a longer time constant than said first saturable core reactor and having a core with a pair of alternating current gate windings and a direct current saturating winding thereon, said last named saturating winding having a lower impedance than said first named saturating winding, said last named gate windings beng connected in parallel, a pair of output terminals, said last named gate windings being connected between one of said input terminals and one of said output terminals, the other of said output terminals being connected to the other of said input terminals, said saturating windings being connected respectively across the output of said rectifier, and variable resistors respectively connected in series with each of said saturating windings.

10. Static electrical pulsation apparatus comprising a pair of input terminals adapted to be connected to a source of alternating current, a first saturable core reactor having a core with a pair of alternating current gate windings and a direct current saturating winding thereon, said gate windings being connected in parallel, a rectifier having its input connected in series with said gate windings across said input terminals, a second saturable core reactor having a longer time constant than said first saturable core reactor and having a core with a pair of alternating current gate windings and a direct current saturating winding thereon, said last named saturating winding having a lower impedance than said first named saturating winding, said gate windings being connected in parallel, a pair of output terminals, said last named gate windings being connected between one of said input terminals and one of said output terminals, the other of said output terminals being connected to the other of said input terminals, said saturating windings being connected respectively across the output of said rectifier, and a capacitor connected across said first named saturating winding.

11. Static electrical pulsation apparatus comprising a pair of input terminals adapted to be connected to a source of alternating current, a first saturable core reactor having a core with a pair of alternating current gate windings and a direct current saturating winding thereon, said gate windings being connected in parallel, a rectifier having its input connected in series with said gate windings across said input terminals, a second saturable core reactor having a longer time constant than said first saturable core reactor and having a core with a pair of alternating current gate windings and a direct current saturating winding thereon, said last named saturating winding having a lower impedance than said first named saturating winding, said last named gate windings being connected in parallel, a pair of output terminals, said last named gate windings being connected between one of said input terminals and one of said output terminals, the other of said output terminals being connected to the other of said input terminals, said saturating windings being connected respectively across the output of said rectifier, and an inductance connected across said last named gate windings.

12. Static electrical pulsation apparatus comprising a pair of input terminals adapted to be connected to a source of alternating current, a first saturable core reactor having a core with a pair of alternating current gate windings and a direct current saturating winding thereon, said gate windings being connected in parallel, a rectifier having its input connected in series with said gate windings across said input terminals, a second saturable core reactor having a longer time constant than said first saturable core reactor and having a core with a pair of alternating current gate windings and a direct current saturating winding thereon, said last named saturating winding having a lower impedance than said first named saturating winding, said last named gate windings being connected in parallel, a pair of output terminals, said last named gate windings being connected between one of said input terminals and one of said output terminals, the other of said output terminals being connected to the other of said input terminals, said saturating windings being connected respectively across the output of said rectifier, variable resistors respectively connected in series with each of said saturating windings, a capacitor connected across said first named saturating winding and an inductance connected across said last named gate windings.

13. Static electrical pulsation apparatus comprising a pair of input terminals adapted to be connected to a source of alternating current, a first saturable core reactor having a three-legged core with a pair of alternating current gate windings respectively on the outer legs and a direct current saturating winding on the center leg thereof, said gate winding being connected in parallel, a bridge rectifier having its input connected in series with said gate windings across said input terminals, a second saturable core reactor having a longer time constant than said first saturable core reactor and having a four-legged core with a pair of alternating current gate windings respectively on the center two legs thereof and a direct current saturating winding on said center two legs, said last named saturating winding having a lower impedance than said first named saturating winding, said last named gate windings being connected in parallel, and a pair of output terminals, said last named gate windings being connected between one of said input terminals and one of said output terminals, the other of said output terminals being connected to the other of said input terminals, said saturating windings being connected respectively across the output of said rectifier.

14. Static electrical pulsation apparatus comprising a pair of input terminals adapted to be connected to a source of alternating current, a first saturable core reactor having a three-legged core with a pair of alternating current gate windings respectively on the outer legs and a direct current saturating winding on the center leg thereof, said gate windings being connected in parallel, a bridge rectifier having its input connected in series with said gate windings across said input terminals, a second saturable core reactor having a longer time constant than said first saturable core reactor and having a four-legged core with a pair of alternating current gate windings respectively on the center two legs thereof and a direct current saturating winding on said center two legs, said last named saturating winding having a lower impedance than said first named saturating winding, said last named gate windings being connected in parallel, a pair of output terminals, said last named gate windings being connected between one of said input terminals and one of said output terminals, the other of said output terminals being connected to the other of said input terminals, said saturating windings being connected respectively across the output of said rectifier, and resistance means connected in series with said last named saturating winding.

15. Static electrical pulsation apparatus comprising a pair of input terminals adapted to be connected to a source of alternating current, a first saturable core reactor having a three-legged core with a pair of alternating current gate windings respectively on the outer legs and a direct current saturating winding on the center leg thereof, said gate windings being connected in parallel, a bridge rectifier having its input connected in series with said gate windings across said input terminals, a second saturable core reactor having a longer time constant than said first saturable core reactor and having a four-legged core with a pair of alternating current gate windings respectively on the center two legs thereof and a direct current saturating winding on said center two legs, said last named saturating winding having a lower impedance than said first named saturating winding, said last named gate windings being connected in parallel, a pair of output terminals, said last named gate windings being connected between one of said input terminals and one of said output terminals, the other of said output terminals being connected to the other of said input terminals, said saturating windings being connected respectively across the output of said rectifier, and variable resistors respectively connected in series with each of said saturating windings.

16. Static electrical pulsation apparatus comprising a pair of input terminals adapted to be connected to a source of alternating current, a first saturable core reactor having a three-legged core with a pair of alternating current gate windings respectively on the outer legs and a direct current saturating winding on the center leg thereof, said gate windings being connected in parallel, a bridge rectifier having its input connected in series with said gate windings across said input terminals, a second saturable core reactor having a longer time constant than said first saturable core reactor and having a four-legged core with a pair of alternating current gate windings respectively on the center two legs thereof and a direct current saturating winding on said center two legs, said last named saturating winding having a lower impedance than said first named saturating winding, said last named gate windings being connected in parallel, a pair of output terminals, said last named gate windings being connected between one of said input terminals and one of said output terminals, the other of said output terminals being connected to the other of said input terminals, said saturating windings being connected respectively across the output of said rectifier, and a capacitor connected across said first named saturating winding.

17. Static electrical pulsation apparatus comprising a pair of input terminals adapted to be connected to a source of alternating current, a first saturable core reactor having a three-legged core with a pair of alternating current gate windings respectively on the outer legs and a direct current saturating winding on the center leg thereof, said gate windings being connected in parallel, a bridge rectifier having its input connected in series with said gate windings across said input terminals, a second saturable core reactor having a longer time constant than said first saturable core reactor and having a four-legged core with a pair of alternating current gate windings respectively on the center two legs thereof and a direct current saturating winding on said center two legs, said last named saturating winding having a lower impedance than said first named saturating winding, said last named gate windings being connected in parallel, a pair of output terminals, said last named gate windings being connected between one of said input terminals and one of said output terminals, the other of said output terminals being connected to the other of said input terminals, said saturating winding being connected respectively across the output of said rectifier, and an inductance connected across said last named gate windings.

18. Static electrical pulsation apparatus comprising a pair of input terminals adapted to be connected to a source of alternating current, a first saturable core reactor having a three-legged core with a pair of alternating current gate windings respectively on the outer legs and a direct current saturating winding on the center leg thereof, said gate windings being connected in parallel, a bridge rectifier having its input connected in series with said gate windings across said input terminals, a second saturable core reactor having a longer time constant than said first saturable core reactor and having a four-legged core with a pair of alternating current gate windings respectively on the center two legs thereof and a direct current saturating winding on said center two legs, said last named saturating winding having a lower impedance than said first named saturating winding, said last named gate windings being connected in parallel, a pair of output terminals, said last named gate windings being connected between one of said input terminals and one of said output terminals, the other of said output terminals being connected to the other of said input terminals, said saturating windings being connected respectively across the output of said rectifier, variable resistors respectively connected in said series with each of said saturating windings, a capacitor connected across said first named saturating winding, and an inductance connected across said last named gate windings.

No references cited.